US012049030B2

(12) United States Patent
Maruyama et al.

(10) Patent No.: US 12,049,030 B2
(45) Date of Patent: Jul. 30, 2024

(54) INJECTION MOLDING SYSTEM (71) Applicant: SEIKO EPSON CORPORATION, Tokyo (JP)

(72) Inventors: Hidenobu Maruyama, Azumino (JP); Kenta Anegawa, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/975,680

(22) Filed: Oct. 28, 2022

(65) Prior Publication Data
US 2023/0134832 A1    May 4, 2023

(30) Foreign Application Priority Data

Oct. 29, 2021 (JP) ................................ 2021-177122

(51) Int. Cl.
| B29C 45/13 | (2006.01) |
| B29C 45/04 | (2006.01) |
| B29C 45/40 | (2006.01) |
| B29C 45/74 | (2006.01) |
| B29C 45/78 | (2006.01) |
| B29K 101/10 | (2006.01) |

(52) U.S. Cl.
CPC .............. *B29C 45/13* (2013.01); *B29C 45/04* (2013.01); *B29C 45/401* (2013.01); *B29C 45/74* (2013.01); *B29C 45/78* (2013.01); *B29C 2045/135* (2013.01); *B29C 2945/76531* (2013.01); *B29C 2945/76732* (2013.01); *B29C 2945/76862* (2013.01); *B29K 2101/10* (2013.01)

(58) Field of Classification Search
CPC .................................. B29C 45/13; B29C 45/04
See application file for complete search history.

(56) References Cited

U.S. PATENT DOCUMENTS

| 3,819,312 | A | * | 6/1974 | Arpajian | ................. | B29C 45/26 |
| | | | | | | 425/573 |
| 2014/0077410 | A1 | * | 3/2014 | Takatsugi | .............. | B29C 45/162 |
| | | | | | | 264/161 |
| 2018/0099445 | A1 | * | 4/2018 | Ishizaki | .................... | C08K 3/36 |
| 2020/0055218 | A1 | * | 2/2020 | Wang | .................. | B29C 45/0084 |
| 2021/0008769 | A1 | | 1/2021 | Tsuchiya | | |

FOREIGN PATENT DOCUMENTS

| CN | 108973013 | A | * | 12/2018 | ............. | B29C 45/16 |
| EP | 3520983 | B1 | * | 3/2021 | ......... | B29C 45/1615 |
| JP | 2021-014049 | A | | 2/2021 | | |

OTHER PUBLICATIONS

Machine translation CN108973013A (Year: 2018).*

* cited by examiner

*Primary Examiner* — Jacob T Minskey
*Assistant Examiner* — Wayne K. Swier
(74) *Attorney, Agent, or Firm* — Harness, Dickey & Pierce, P.L.C.

(57) ABSTRACT

An injection molding system includes a first unit that has a first injection molding machine configured to inject a first molding material into a first cavity partitioned by a first fixed mold and a movable mold, a second unit that includes a second injection molding machine configured to inject a second molding material into a second cavity partitioned by a second fixed mold and the movable mold, and a movement mechanism configured to, after the first molding material is injected into the first cavity, move the movable mold filled with the first molding material from the first injection molding machine to the second injection molding machine.

9 Claims, 9 Drawing Sheets

INJECTION MOLDING SYSTEM

The present application is based on, and claims priority from JP Application Serial Number 2021-177122, filed Oct. 29, 2021, the disclosure of which is hereby incorporated by reference herein in its entirety.

BACKGROUND

1. Technical Field

The present disclosure relates to an injection molding system.

2. Related Art

JP-A 2021-014049 discloses an injection molding system in which a molten resin is injected into a mold in a state in which an insert part is disposed in the mold, thereby integrating the insert part and the resin. In this injection molding system, an insert part is fitted into a component holding portion provided in a mold by a holding member provided at a tip end portion of a robot arm, and a state in which the insert part is fitted into the component holding portion is maintained by using the holding member to hold the insert part even after an operation of closing the mold is started, and positioning accuracy of the insert part with respect to the mold is ensured by retracting the holding member from between the molds before the mold closing operation is completed.

In the technology of Japanese Unexamined Patent Publication No. 2021-014049 described above, the configuration for ensuring the positioning accuracy of the insert part with respect to the mold is complicated. Therefore, a technique capable of easily securing the positioning accuracy of an insert part with respect to a mold is desired.

SUMMARY

In accordance with one aspect of the present disclosure, an injection molding system is provided. The injection molding system includes a first unit that has a first injection molding machine configured to inject a first molding material into a first cavity partitioned by a first fixed mold and a movable mold, a second unit that includes a second injection molding machine configured to inject a second molding material into a second cavity partitioned by a second fixed mold and the movable mold, and a movement mechanism configured to, after the first molding material is injected into the first cavity, move the movable mold filled with the first molding material from the first injection molding machine to the second injection molding machine.

DESCRIPTION OF EMBODIMENTS

A. First Embodiment

Figure 1:
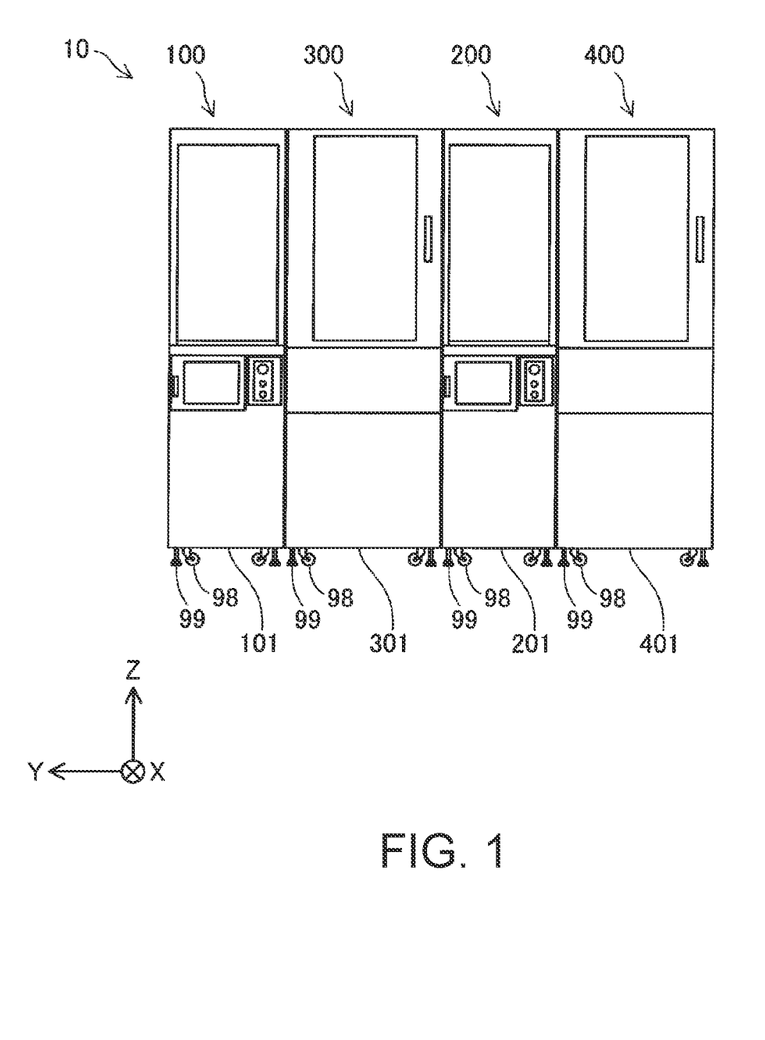
FIG. 1 is a front view showing schematic configuration of an injection molding system according to a first embodiment.
Figure 2:
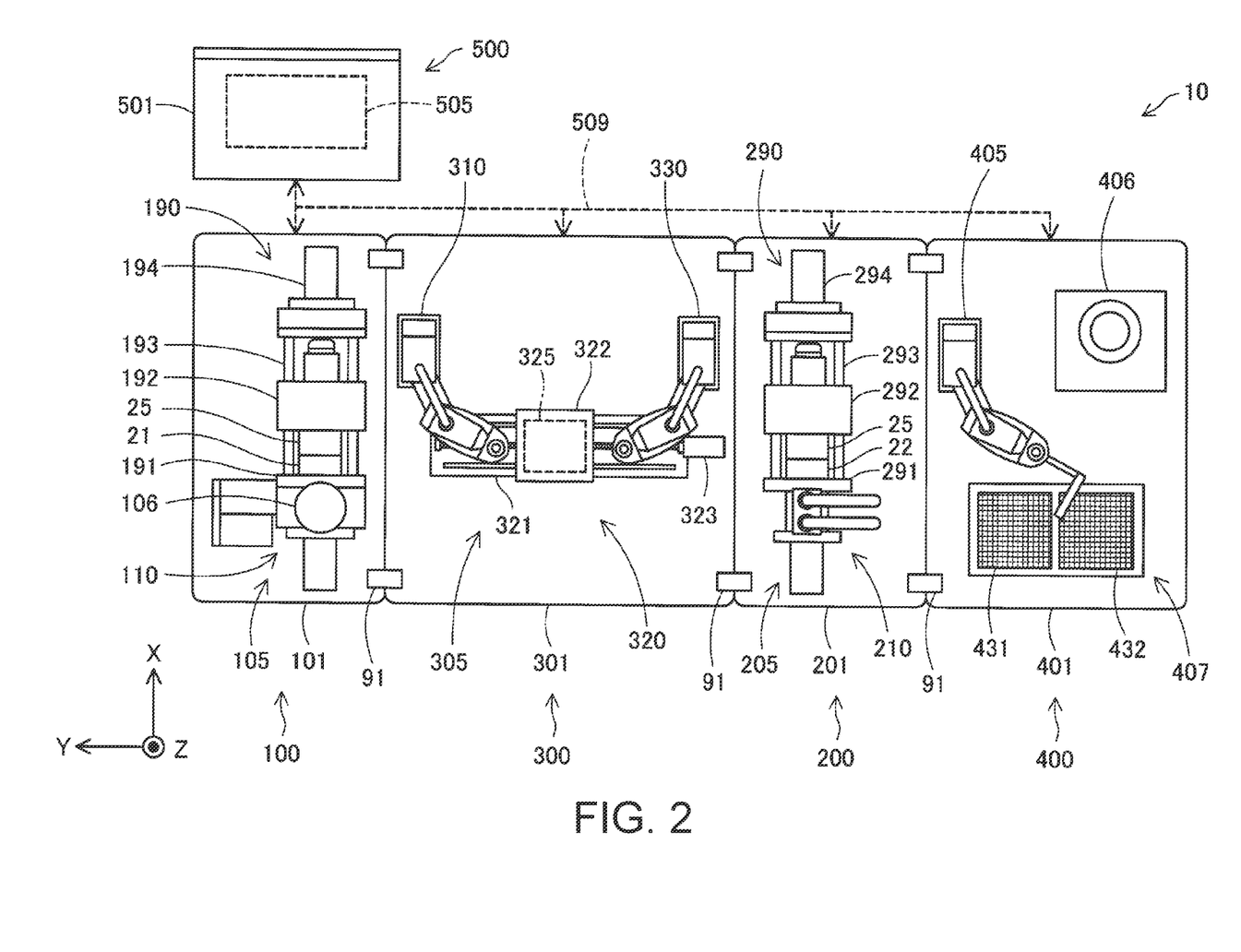
FIG. 2 is a plan view showing schematic configuration of the injection molding system according to the first embodiment.

FIG. 1 is a front view showing schematic configuration of an injection molding system 10 according to a first embodiment. FIG. 2 is a plan view showing schematic configuration of the injection molding system 10 according to the first embodiment. In FIGS. 1 and 2, arrows along X, Y, and Z directions orthogonal to each other are shown. The X, Y, and Z directions are directions along the X-axis, the Y-axis, and the Z-axis, which are three spatial axes orthogonal to each other, and each direction includes both the direction along one side of the X-axis, the Y-axis, and the Z-axis and the opposite side. The X-axis and the Y-axis are axes along a horizontal plane, and the Z-axis is an axis along a vertical line. The −Z direction is a vertical direction, and the +Z direction is a direction opposite to the vertical direction. The −Z direction is also referred to as "down", and the +Z direction is also referred to as "up". In the other drawings, arrows along the X, Y, and Z directions are shown as appropriate. The X, Y, and Z directions in FIGS. 1 and 2 and the X, Y, and Z directions in other drawings represent the same directions.

As shown in FIG. 1, the injection molding system 10 includes a first unit 100, a second unit 200, a third unit 300, and a fourth unit 400. In the present embodiment, the first unit 100, the third unit 300, the second unit 200, and the fourth unit 400 are arranged side by side in this order from the +Y direction toward the −Y direction. As shown in FIG. 2, the injection molding system 10 further includes a control unit 500. In the present embodiment, the control unit 500 is disposed in the +X direction with respect to the first unit 100.

As shown in FIG. 1, in the present embodiment, each of the units 100, 200, 300, and 400 includes a box-like housing, and is configured as one unit by aggregating one or a plurality of devices, members, and the like inside the housing. In the following description, a housing 101 of the first unit 100 may be referred to as a first housing 101, a housing 201 of the second unit 200 may be referred to as a second housing 201, a housing 301 of the third unit 300 may be referred to as a third housing 301, and a housing 401 of the fourth unit 400 may be referred to as a fourth housing 401. Each of the housings 101, 201, 301, and 401 includes a base and a cover that covers an upper surface of the base. FIG. 2 shows each of the units 100, 200, 300, and 400 with the cover of each of the housings 101, 201, 301, and 401 removed. Note that, in another embodiment, each of the units 100, 200, 300, and 400 may be configured as one unit by aggregating one or a plurality of devices, members, or the like on a base, for example.

As shown in FIG. 2, in the present embodiment, each of the units 100, 200, 300, and 400 is detachably coupled to another adjacent unit. Specifically, a plate-shaped member 91 bridged between the first unit 100 and the third unit 300 is fastened to both units 100, 300 with bolts, so that the third unit 300 is coupled to the first unit 100. A plate-shaped member 91 bridged between the third unit 300 and the second unit 200 is fastened to both units 200, 300 with bolts, so that the second unit 200 is coupled to the third unit 300. A plate-shaped member 91 bridged between the second unit 200 and the fourth unit 400 is fastened to both units 200, 400 with bolts, so that the fourth unit 400 is coupled to the second unit 200. The coupling means between each of the units 100, 200, 300, and 400 is not limited to means using the plate-shaped members 91 and bolts, but may also be the means using, for example, clamps or the like. In addition, the arrangement of the units 100, 200, 300, and 400 can be arbitrarily changed by releasing the coupling with other adjacent units. For example, the first unit 100 and the second unit 200 may be disposed adjacent to each other. In this case, both units 100, 200 may be detachably coupled by a plate-shaped member 91 and bolts.

As shown in FIG. 1, wheels 98 are attached to the bottom surfaces of each housing 101, 201, 301, and 401 of the units 100, 200, 300, and 400. Each of the units 100, 200, 300, and 400 can be moved independently by the wheels 98 when not coupled to other units. A bolt-type stopper 99 is provided near each wheel 98. Each of the units 100, 200, 300, and 400 can be fixed at an installation place by the stoppers 99.

As shown in FIG. 2, the control unit 500 includes a controller 505. In the present embodiment, the controller 505 is disposed inside a box-like electrical box 501. The controller 505 is coupled to the units 100, 200, 300, and 400 by a cable 509. The controller 505 controls various devices provided in each of the units 100, 200, 300, and 400. In the present embodiment, the controller 505 is configured by a programmable logic controller (PLC). The controller 505 is programmed in a language such as a ladder language to control cooperative operations of various devices provided in the units 100, 200, 300, and 400. Although not shown in the drawings, the wheels 98 and the stoppers 99 are also provided on the bottom surface of the electrical box 501 in the same manner as the housings 101, 201, 301, and 401. Further, the arrangement of the control unit 500 with respect to each of the units 100, 200, 300, and 400 can be arbitrarily changed. For example, the control unit 500 may be disposed in the +Y direction with respect to the first unit 100 instead of the +X direction with respect to the first unit 100.

The first unit 100 includes a first injection molding machine 105. The first injection molding machine 105 is fixed to the first housing 101. The first injection molding machine 105 includes a first injection device 110 and a first mold clamping device 190. The first injection device 110 injects a first molding material. In the present embodiment, the first molding material is, for example, a thermoplastic resin such as an ABS resin or polypropylene (PP). A specific configuration of the first injection device 110 will be described later.

The first mold clamping device 190 includes a first fixed plate 191, a first movable plate 192, a first tie bar 193, and a first mold driving section 194. The first fixed plate 191 is fixed to the tip end portion of the rod-shaped first tie bar 193. The first movable plate 192 is moved along the first tie bar 193 by the first mold driving section 194, which is configured by combining a motor, a speed reducer, and a ball screw.

A first fixed mold 21 is mounted on the first fixed plate 191, and a movable mold 25 is mounted on the first movable plate 192. The first fixed mold 21 is mounted the first fixed plate 191 by, for example, a bolt or a clamping device. The movable mold 25 is mounted on the first movable plate 192 by, for example, an electric clamping device driven under the control of the controller 505. The movable mold 25 moves together with the first movable plate 192 and comes into contact with the first fixed mold 21. A first cavity is formed by bringing the movable mold 25 into contact with the first fixed mold 21. The first cavity is a space defined by the first fixed mold 21 and the movable mold 25. The first injection molding machine 105 injects the first molding material from the first injection device 110 into the first cavity to mold the first molded article made of the first molding material.

The second unit 200 includes a second injection molding machine 205. The second injection molding machine 205 is fixed to the second housing 201. The second injection molding machine 205 includes a second injection device 210 and a second mold clamping device 290. The second injection device 210 injects a second molding material. In this embodiment, the second molding material is a thermosetting resin. More specifically, in the present embodiment, the second molding material is a two-component type silicone rubber. A specific configuration of the second injection device 210 will be described later.

The second mold clamping device 290 includes a second fixed plate 291, a second movable plate 292, a second tie bar 293, and a second mold driving section 294. The second fixed plate 291 is fixed to a tip end portion of a rod-shaped second tie bar 293. The second movable plate 292 is moved along the second tie bar 293 by the second mold driving section 294, which is configured by combining a motor, a speed reducer, and a ball screw.

A second fixed mold 22 is mounted on the second fixed plate 291, and the movable mold 25 is mounted on the second movable plate 292. The second fixed mold 22 is mounted on the second fixed plate 291 by, for example, a bolt or a clamping device. The movable mold 25 is mounted on the second movable plate 292 by, for example, an electric clamping device driven under the control of the controller 505. The movable mold 25 moves together with the second movable plate 292 and comes into contact with the second fixed mold 22. When the movable mold 25 comes into contact with the second fixed mold 22, a second cavity is formed. The second cavity is a space defined by the second fixed mold 22 and the movable mold 25.

The second injection molding machine 205 injects the second molding material from the second injection device 210 into the second cavity. The movable mold 25 mounted on the second movable plate 292, after a first molded article was formed by the first injection molding machine 105, is transported from the first injection molding machine 105 to the second injection molding machine 205 by a movement mechanism 305 (described later.) In the present embodiment, the first molded article that was molded by the first injection molding machine 105 was no released, but remains in intimate contact with the movable mold 25 mounted on the second injection molding machine 205. The second injection molding machine 205 performs insert molding, using the first molded article as an insert part, to form a second molded article that includes a portion made from the first molding material and a portion made from the second molding material.

The third unit 300 includes a movement mechanism 305. The movement mechanism 305 is fixed to the third housing 301. The movement mechanism 305 moves the movable mold 25 from the first injection molding machine 105 to the second injection molding machine 205. In this embodiment, the movement mechanism 305 includes a first moving section 310, a second moving section 320, and a third moving section 330. The first moving section 310 is disposed in a portion of the third housing 301 near the first unit 100. The second moving section 320 is disposed in a central portion of the third housing 301. The third moving section 330 is disposed in a portion of the third housing 301 near the second unit 200.

The first moving section 310 moves the movable mold 25 from the first injection molding machine 105 to the second moving section 320. In this embodiment, the first moving section 310 is formed by a robot arm. More specifically, in the present embodiment, the first moving section 310 is configured by a horizontally articulated robot. An end effector for gripping the movable mold 25 is mounted on a tip end portion of the first moving section 310. In this embodiment, the end effector of the first moving section 310 is a gripper that nips and grips the movable mold 25. The first moving section 310 is driven under the control of the controller 505. In the present embodiment, a door or an opening is provided in a portion of the first housing 101 facing the third housing 301 and in a portion of the third housing 301 facing the first housing 101, so that the first moving section 310 can access the inside of the first housing 101. After the first moving section 310 grips the upper portion of the movable mold 25, the fixing of the movable mold 25 by the clamping device that is provided on the first movable plate 192 is released. The first moving section 310 pulls out the movable mold 25 upward from between the first fixed mold 21 and the first movable plate 192. The movable mold 25 is preferably provided with a handle-like portion so that the end effector can easily grasp the movable mold 25. In another embodiment, the first moving section 310 may be configured by, for example, a vertically articulated robot instead of a horizontally articulated robot. The end effector of the first moving section 310 may be a vacuum suction pad that vacuum-sucks the movable mold 25, instead of the gripper.

The second moving section 320 moves the movable mold 25 from the first moving section 310 toward the third moving section 330. In this embodiment, the second moving section 320 includes a rail section 321, a slide section 322, and a slide driving section 323. The rail section 321 is provided along the Y direction. One end of the rail section 321 is disposed in the vicinity of the first moving section 310, and the other end of the rail section 321 is disposed in the vicinity of the third moving section 330. The slide section 322 is configured to be movable on the rail section 321 while being guided by the rail section 321. The movable mold 25 is placed on the upper surface of the slide section 322 by the first moving section 310. The slide section 322 is moved on the rail section 321 by the slide driving section 323. In this embodiment, the slide driving section 323 is constructed by combining a motor, a speed reducer, and a ball screw. The slide driving section 323 is driven under the control of the controller 505.

In this embodiment, the slide section 322 includes a temperature adjustment section 325. The temperature adjustment section 325 adjusts the temperature of the movable mold 25 disposed on the slide section 322. In the present embodiment, the temperature adjustment section 325 is constituted by a heater and heats the movable mold 25. The temperature adjustment section 325 is coupled to the controller 505 through, for example, a flexible cable, and the temperature of the temperature adjustment section 325 is controlled by the controller 505. In another embodiment, the temperature adjustment section 325 may be configured to cool the movable mold 25. In this case, the temperature adjustment section 325 may be configured by, for example, a pipe through which a refrigerant flows, or may be configured by a Peltier element. When the temperature adjustment section 325 is composed of a pipe through which a refrigerant flows, the refrigerant can be supplied to the pipe via, for example, a flexible tube.

The third moving section 330 moves the movable mold 25 from the second moving section 320 to the second injection molding machine 205. In the present embodiment, the third moving section 330 is configured by a robot arm. More specifically, in this embodiment, the third moving section 330 is configured by a horizontally articulated robot. An end effector for gripping the movable mold 25 is mounted on the tip end portion of the third moving section 330. In this embodiment, the end effector of the third moving section 330 is a gripper that nips and grips the movable mold 25. The third moving section 330 is driven under the control of the controller 505. In the present embodiment, a door or an opening is provided in a portion of the second housing 201 facing the third housing 301 and a portion of the third housing 301 facing the second housing 201, so that the third moving section 330 can access the inside of the second housing 201. The third moving section 330 inserts the movable mold 25 between the second fixed mold 22 and the second movable plate 292 from above. The movable mold 25 is fixed to the second movable plate 292 by a clamping device provided on the second movable plate 292. In another embodiment, the third moving section 330 may be configured by, for example, a vertically articulated robot instead of a horizontally articulated robot. The end effector of the third moving section 330 may be a vacuum suction pad that vacuum-sucks the movable mold 25, instead of the gripper.

In this embodiment, the fourth unit 400 includes an extractor 405, an inspection device 406, and a stacking mechanism 407. The extractor 405, the inspection device 406, and the stacking mechanism 407 are fixed to the fourth housing 401. The extractor 405 takes out the second molded article from between the second fixed mold 22 and the movable mold 25. In the present embodiment, the extractor 405 is constituted by a robot arm. More specifically, in the present embodiment, the extractor 405 is configured by a horizontally articulated robot. An end effector for gripping the second molded article is mounted on a tip end portion of the extractor 405. The end effector of the extractor 405 may be a gripper that nips and grips the second molded article, or a vacuum suction pad that grips the second molded article by vacuum suction. A configuration for gate cutting of the second molded article may be added to the end effector of the extractor 405. For example, the end effector of the extractor 405 may be provided with a cutter for gate cutting of the second molded article. In the present embodiment, doors or openings are provided in a portion of the second housing 201 facing the fourth housing 401 and a portion of the fourth housing 401 facing the second housing 201, so that the extractor 405 can access the inside of the second housing 201. The extractor 405 may be configured by, for example, a vertically articulated robot instead of a horizontally articulated robot.

The inspection device 406 inspects the second molded article. In the present embodiment, the inspection device 406 includes a camera for capturing an image of the second molded article, and performs visual inspection of the second molded article using the image captured by the second molded article. A second molded article determined by the inspection device 406 to be a non-defective article is placed on the tray by the extractor 405. A second molded article determined by the inspection device 406 to be a defective article is transported by the extractor 405 to a predetermined defective article rejection area.

The stacking mechanism 407 stacks trays for accommodating second molded articles inspected by the inspection device 406. The stacking mechanism 407 includes a first lifting device 431 and a second lifting device 432. The extractor 405 places the second molded article on the tray disposed on the first lifting device 431. When a predetermined number of the second molded articles are placed on the tray, the first lifting device 431 lowers the tray. A tray arranged at the top of the second lifting device 432 is arranged on the lowered tray by being slid and moved by a slide mechanism. A plurality of trays are stacked on the second lifting device 432, and when the uppermost tray is moved onto the first lifting device 431, the second lifting device 432 raises up the remaining trays. When a predetermined number of trays on which the second molded articles are placed are stacked on the first lifting device 431, the production of the second molded articles is temporarily stopped. At this time, the operator can open a door provided in the fourth housing 401, take the trays on which the second molded articles are placed out from the fourth housing 401, and replenish new trays on the second lifting device 432.

Figure 3:
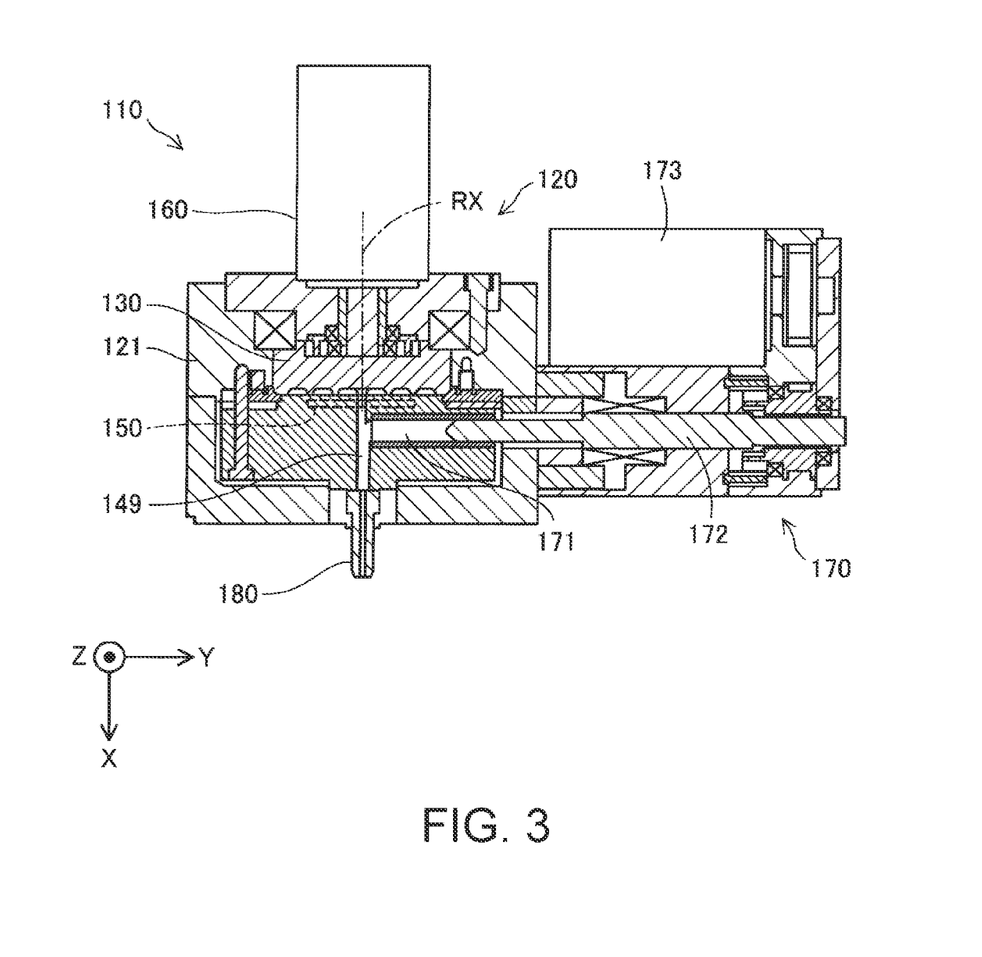
FIG. 3 is an explanatory view showing schematic configuration of a first injection device according to the first embodiment.

FIG. 3 is an explanatory view showing schematic configuration of the first injection device 110. The first injection device 110 includes a plasticization mechanism 120, a first injection control mechanism 170, and a first nozzle 180. The plasticization mechanism 120 includes a screw case 121, a flat screw 130, a barrel 140, a heater 150, and a screw driving section 160.

The screw case 121 and the barrel 140 are fixed to each other. The flat screw 130 is disposed in an internal space defined by the screw case 121 and the barrel 140. The flat screw 130 is rotationally driven around a rotation axis RX by the screw driving section 160, which is configured by combining a motor and a speed reducer. A communication hole 149, which communicates with a first injection cylinder 171 (to be described later), is provided in the center of the barrel 140. The heater 150 is provided in the vicinity of the communication hole 149.

The internal space in which the flat screw 130 is disposed communicates with a hopper 106 shown in FIG. 2 via a passage (not shown.) In the hopper 106, for example, a first molding material processed in pellet form is stored. The first molding material supplied from the hopper 106 to between the flat screw 130 and the barrel 140 is plasticized by rotation of the flat screw 130 and heating by the heater 150. Plasticization is a concept including melting, and is a change from a solid to a state having fluidity. Specifically, in the case of a material in which glass transition occurs, plasticization means that the temperature of the material becomes equal to or higher than the glass transition point. In the case of a material in which glass transition does not occur, plasticization means that the temperature of the material becomes above the melting point. Rotation of the flat screw 130 by the screw driving section 160 and heating by the heater 150 are controlled by the controller 505.

Figure 4:
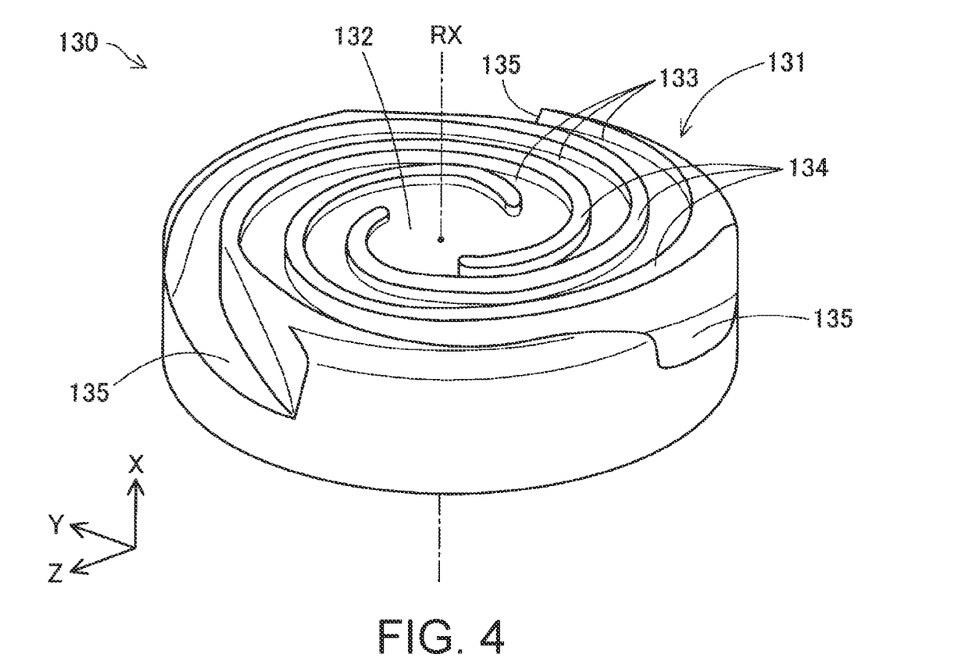
FIG. 4 is a perspective view showing schematic configuration of a flat screw.

FIG. 4 is a perspective view illustrating schematic configuration of the flat screw 130. The flat screw 130 has a substantially cylindrical shape. The height of the flat screw 130 in the axial direction, which is a direction along the central axis, is smaller than the diameter of the flat screw 130. In an end face 131 of the flat screw 130 facing the barrel 140, vortex shape grooves 133 are formed around a central portion 132 of the end face 131. The grooves 133 communicate with a material inlet 135 formed in a side surface of the flat screw 130. The first molding material supplied from the hopper 106 is introduced into the grooves 133 from the material inlet 135. In this embodiment, three grooves 133 are formed in the end face 131 of the flat screw 130. The grooves 133 are separated from each other by ridge portions 134. The number of grooves 133 is not limited to three, but may be one, two, or four or more. The shape of the grooves 133 is not limited to a vortex shape, but may be a helical shape or an involute curvilinear, or may be a shape that draws an arc from the central portion 132 toward the outer periphery.

Figure 5:
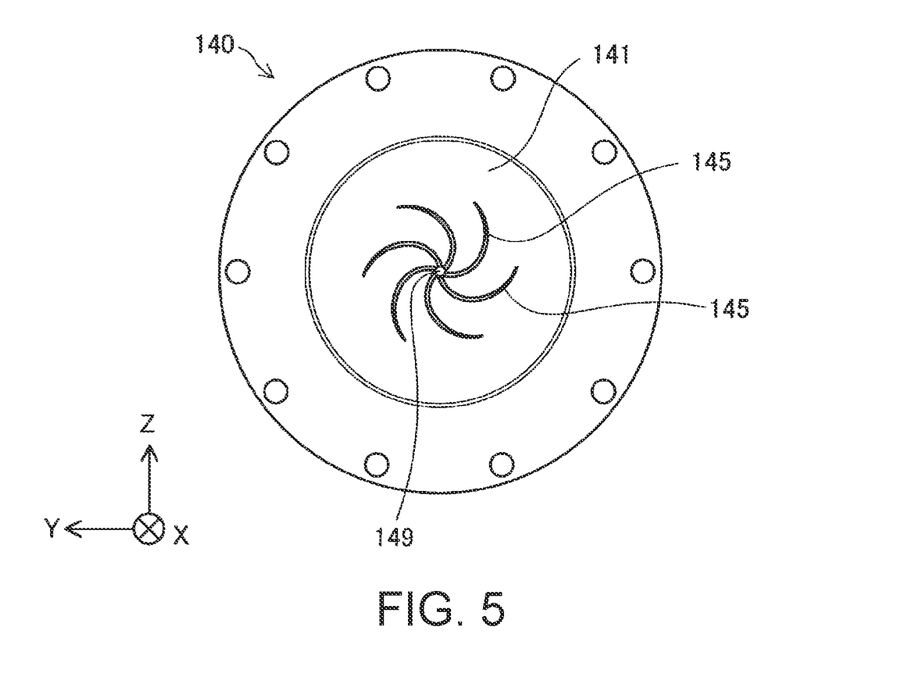
FIG. 5 is a plan view showing schematic configuration of a barrel.

FIG. 5 is a plan view showing schematic configuration of the barrel 140. The barrel 140 has an opposing surface 141 that opposes the end face 131 of the flat screw 130. An opening of the communication hole 149 described above is formed at the center of the opposing surface 141. A plurality of guide grooves 145 that are coupled to the communication hole 149 and that extend vertically from the communication hole 149 toward the outer periphery are formed in the opposing surface 141. The first molding material supplied to the grooves 133 of the flat screw 130 flows along the grooves 133 and the guide grooves 145 by the rotation of the flat screw 130 while being plasticized between the flat screw 130 and the barrel 140 by rotation of the flat screw 130 and heating by the heater 150, and is guided to the central portion 132 of the flat screw 130. The material flowing into the central portion 132 is guided from the communication hole 149 to the first injection cylinder 171. The guide grooves 145 may not be coupled to the communication hole 149. Further, the barrel 140 may not be provided with the guide grooves 145.

As shown in FIG. 3, the first injection control mechanism 170 includes the first injection cylinder 171, a first plunger 172, and a first plunger driving section 173. The first injection control mechanism 170 has a function of injecting the first molding material in the first injection cylinder 171 into the first cavity through the first nozzle 180. Under the control of the controller 505, the first injection control mechanism 170 controls injection amount, injection speed, and injection pressure of the first molding material from the first nozzle 180. The first injection cylinder 171 is a substantially cylindrical member coupled to the communication hole 149 of the barrel 140. The first plunger 172 is disposed in the first injection cylinder 171. The first plunger 172 slides in the first injection cylinder 171 by the first plunger driving section 173, which is configured by combining a motor and a speed reducer, and pressure-feeds the first molding material in the first injection cylinder 171 into the first nozzle 180.

In the present embodiment, the first nozzle 180 is configured as a hot runner nozzle. A heater is disposed around the first nozzle 180, and the controller 505 controls the heater to control the heat retention temperature and the injection temperature of the first molding material. The gate structure of the hot runner nozzle may be an open gate or a valve gate. The first injection molding machine 105 may employ a cold runner instead of a hot runner.

Figure 6:
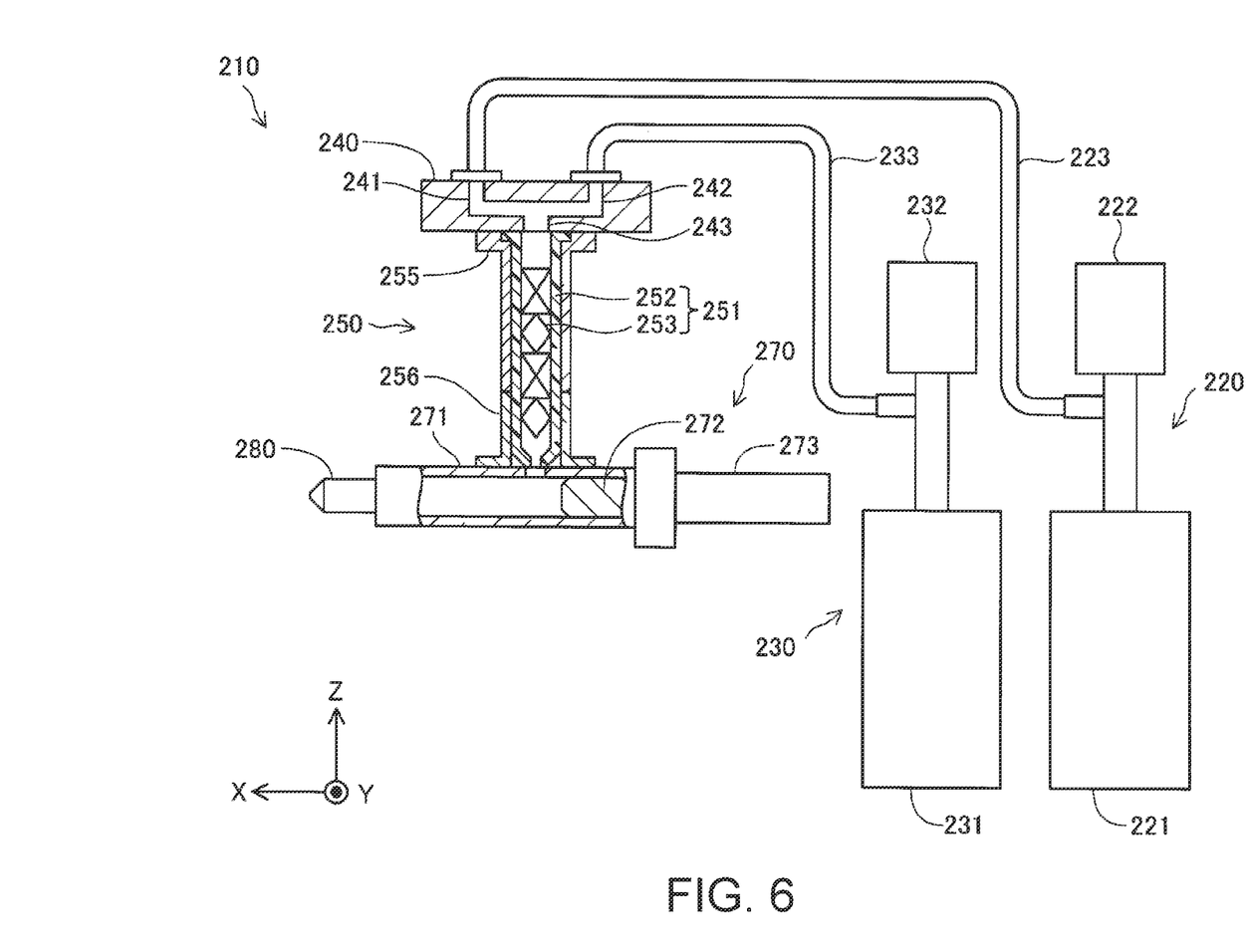
FIG. 6 is an explanatory view showing schematic configuration of a second injection device according to the first embodiment.

FIG. 6 is an explanatory view showing schematic configuration of the second injection device 210 in the present embodiment. A first fluid supply device 220 and a second fluid supply device 230 are coupled to the second injection device 210. In this embodiment, the first fluid supply device 220 and the second fluid supply device 230 are disposed in the second housing 201.

The first fluid supply device 220 includes a first tank 221 and a first pump 222. A first fluid is stored in the first tank 221. The first fluid contains a main agent of the two-component type second molding material. In this embodiment, the first fluid contains a silicone polymer as the main agent of the two-component type silicone rubber.

The first pump 222 is provided in the first tank 221. The first pump 222 pressure feeds the first fluid stored in the first tank 221 to the second injection device 210. The first pump 222 is configured by a positive displacement pump such as a screw pump. The first pump 222 is driven under the control of the controller 505. The first pump 222 is coupled to a channel member 240 described later by a first pipe 223.

The second fluid supply device 230 includes a second tank 231 and a second pump 232. The second fluid is stored in the second tank 231. The second fluid is stored in the second tank 231. The second fluid contains a polymerization initiator for starting the polymerization reaction of the two-component type second molding material. By combining a predetermined amount of the first fluid and a predetermined amount of the second fluid, a polymerization reaction of the two-component type second molding material can be started.

The second pump 232 is provided to the second tank 231. The second pump 232 pressure feeds the second fluid stored in the second tank 231 to the second injection device. The second pump 232 is constituted by a positive displacement pump such as a screw pump. The second pump 232 is driven under the control of the controller 505. The second pump 232 is coupled to the channel member 240 via a second pipe 233.

The second injection device 210 includes the channel member 240, a mixing section 250, a second injection control mechanism 270, and a second nozzle 280. In this embodiment, the channel member 240 has a rectangular parallelepiped outer shape. The first pipe 223 and the second pipe 233 are coupled to the channel member 240. A first channel 241, a second channel 242, and a flow merging path 243 are provided inside the channel member 240.

One end of the first channel 241 communicates with the first pump 222 via the first pipe 223, and the other end of the first channel 241 communicates with one end of the flow merging path 243. One end of the second channel 242 communicates with the second pump 232 via the second pipe 233, and the other end of the second channel 242 communicates with the one end of the flow merging path 243. The first fluid flowing into the first channel 241 from the first pipe 223 flows toward the flow merging path 243. The second fluid flowing into the second channel 242 from the second pipe 233 flows toward the flow merging path 243. The first fluid and the second fluid merge in the flow merging path 243 and flow to the mixing section 250.

The mixing section 250 includes a static mixer 251. The static mixer 251 has a mixing cylinder 252 and a stirring member 253. The mixing cylinder 252 is a hollow tube member. One end of the mixing cylinder 252 is coupled to the channel member 240 via a first coupling member 255. The other end of the mixing cylinder 252 is coupled to a side surface portion of a second injection cylinder 271 (to be described later) via a second coupling member 256. The mixing cylinder 252 communicates with the flow merging path 243 and the second injection cylinder 271.

The stirring member 253 is disposed in the mixing cylinder 252. In the present embodiment, the stirring member 253 is configured by a plurality of mixing elements coupled to each other. The mixing elements are arranged side by side from one end to the other end of the mixing cylinder 252. Each mixing element has a shape obtained by twisting a rectangular plate 180 degrees. Rotation directions in the twists of adjacent mixing elements are different from each other. The mixing elements are fixed to an inner wall surface of the mixing cylinder 252 and are stationary with respect to the mixing cylinder 252. Although the stirring member 253 having four mixing elements is shown in FIG. 6 for easy understanding of the technology, the number of mixing elements of the stirring member 253 may be, for example, several or several tens of mixing elements.

The static mixer 251 mixes the first fluid and the second fluid flowing into the mixing cylinder 252 by a division process, a conversion process, and an inversion process by the mixing elements of the stirring member 253. The division process is the action of dividing the flow of fluid. The conversion process is the action of moving the fluid from a central axis of the mixing cylinder 252 toward an inner wall surface or from the inner wall surface toward the central axis. The inversion process is an action of inverting the direction of the vortex of the fluid flowing in a vortex state around the central axis of the mixing cylinder 252.

The second injection control mechanism 270 measures the second molding material and injects the second molding material. In this embodiment, the second injection control mechanism 270 includes the second injection cylinder 271, a second plunger 272, and a second plunger driving section 273.

The second injection cylinder 271 is a hollow tube member. The second molding material in which the first fluid and the second fluid are mixed by the mixing section 250 accumulates in the second injection cylinder 271. The second nozzle 280 is coupled to an end portion of the second injection cylinder 271. The second plunger 272 is disposed in the second injection cylinder 271.

The second plunger driving section 273 moves the second plunger 272 along the center axis of the second injection cylinder 271. The second plunger driving section 273 moves the second plunger 272 toward the second nozzle 280 to inject the second molding material in the second injection cylinder 271 from the second nozzle 280. In this embodiment, the second plunger driving section 273 is configured by combining a motor and a speed reducer. The second plunger driving section 273 is driven under the control of the controller 505.

Figure 7:
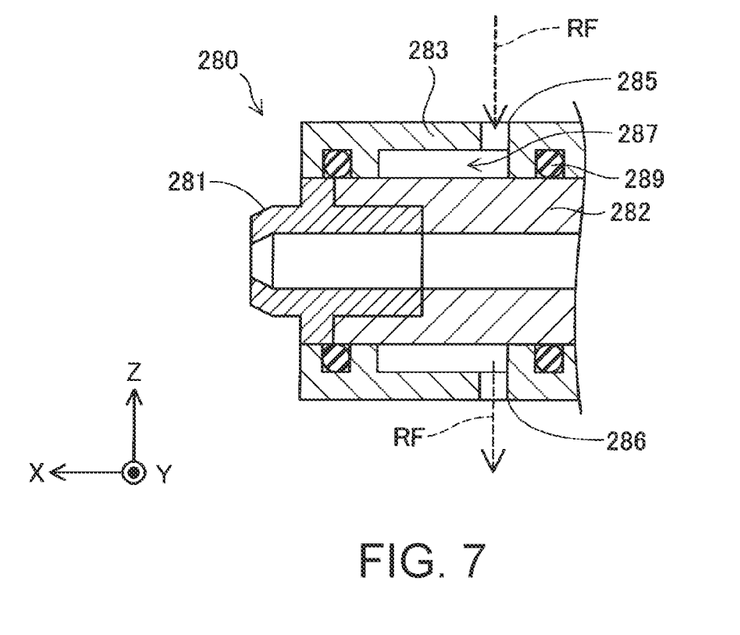
FIG. 7 is a cross-sectional view showing configuration of a second nozzle according to the first embodiment.

FIG. 7 is a cross-sectional view showing configuration of the second nozzle 280. In the present embodiment, the second nozzle 280 includes a nozzle tip 281, a nozzle channel member 282, and a nozzle cover 283. The nozzle tip 281 is a hollow tube member. An opening through which the second molding material is injected is provided in a tip end portion of the nozzle tip 281. The rear end portion of the nozzle tip 281 is fixed to the second injection cylinder 271 via the nozzle channel member 282.

The nozzle cover 283 is provided so as to cover an outer peripheral side surface of the nozzle tip 281 and an outer peripheral side surface of the nozzle channel member 282. In the present embodiment, a refrigerant inlet 285 and a refrigerant outlet 286 are provided at a side surface section of the nozzle cover 283. An inner wall surface of the nozzle cover 283 is provided with a groove shaped refrigerant channel 287 for bringing the refrigerant inlet 285 and the refrigerant outlet 286 into communication with each other. A refrigerant RF is supplied to the refrigerant inlet 285. The refrigerant RF is, for example, water. The refrigerant RF introduced into the refrigerant channel 287 from the refrigerant inlet 285 is discharged from the refrigerant outlet 286. The refrigerant RF discharged from the refrigerant outlet 286 is cooled by, for example, a chiller and circulated to the refrigerant inlet 285. O-rings 289 seal between the nozzle cover 283 and the nozzle tip 281 and between the nozzle cover 283 and the nozzle channel member 282. The refrigerant channel 287 may sometimes be referred to as a cooling section.

Figure 8:
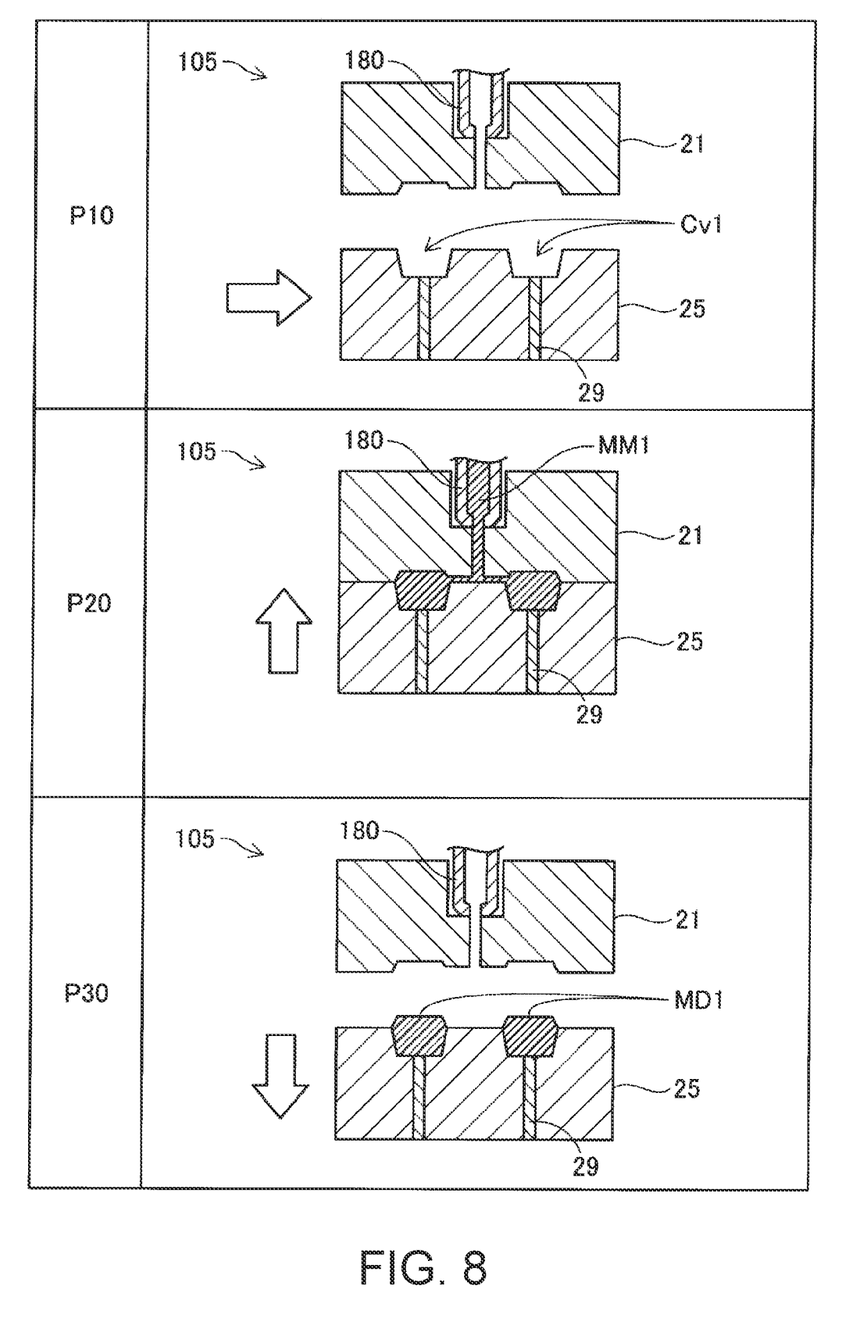
FIG. 8 is a first explanatory view showing a state of insert molding by the injection molding system.
Figure 9:
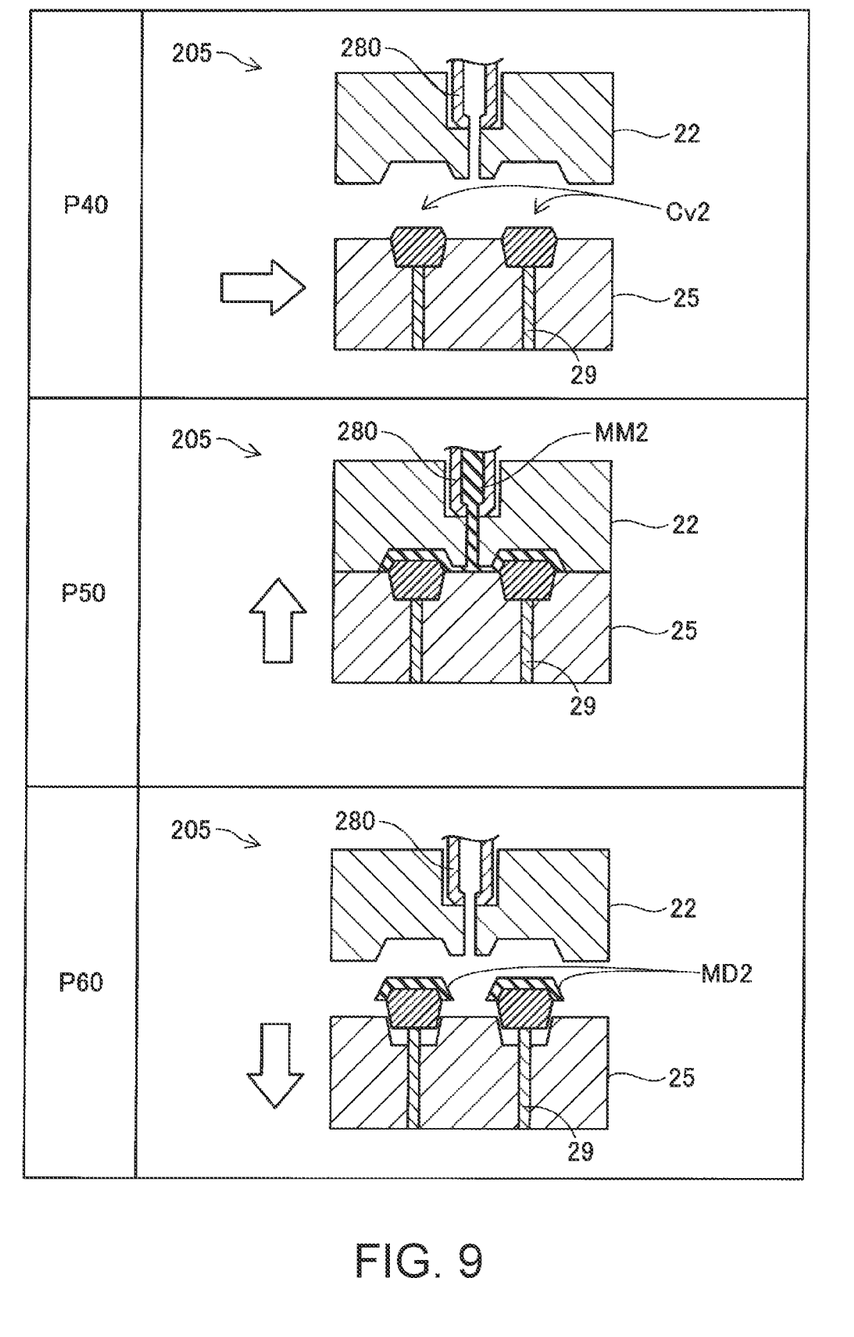
FIG. 9 is a second explanatory view showing a state of insert molding by the injection molding system.

FIG. 8 is a first explanatory view showing a state of insert molding by the injection molding system 10. FIG. 9 is a second explanatory view showing a state of insert molding by the injection molding system 10. As shown in FIG. 8, first, in a process step P10, the movable mold 25 is mounted on the first injection molding machine 105. For example, the movable mold 25 is inserted between the first fixed mold 21 and the first movable plate 192 by the first moving section 310 and fixed to the first movable plate 192 by a clamping device driven under the control of the controller 505.

In a process step P20, the first injection molding machine 105 uses the first mold clamping device 190 to bring the movable mold 25 into contact with the first fixed mold 21, and then injects first molding material MM1 from the first nozzle 180 of the first injection device 110 into first cavities Cv1 defined by the first fixed mold 21 and the movable mold 25. The first molding material MM1 injected from the first nozzle 180 fills the first cavities Cv1. The first molding material MM1 in the first cavities Cv1 is cured to mold first molded articles MD1.

In process step P30, the first injection molding machine 105 uses the first mold clamping device 190 to separate the movable mold 25 from the first fixed mold 21. In process step P30, ejector pins 29 housed in the movable mold 25 do not protrude from the movable mold 25, and the first molded articles MD1 are not released from the movable mold 25. Thereafter, in a state where the first molded articles MD1 remain in intimate contact with the movable mold 25, the movable mold 25 is taken out from the first injection molding machine 105 by the first moving section 310 of the movement mechanism 305, and is moved to the second injection molding machine 205 by the second moving section 320 and the third moving section 330.

As shown in FIG. 9, in process step P40, the movable mold 25 is moved from the first injection molding machine 105 to the second injection molding machine 205 by the movement mechanism 305, and the movable mold 25 is mounted in the second injection molding machine 205. The first molded articles MD1 are in intimate contact with the movable mold 25 mounted in the second injection molding machine 205 without having been released. The movable mold 25 is, for example, inserted between the second fixed mold 22 and the second movable plate 292 by the third moving section 330, and is fixed to the second movable plate 292 by a clamping device driven under the control of the controller 505.

In process step P50, the second injection molding machine 205 uses the second mold clamping device 290 to bring the movable mold 25 into contact with the second fixed mold 22, and then injects a second molding material MM2 from the second nozzle 280 of the second injection device 210 into second cavities Cv2 defined by the second fixed mold 22 and the movable mold 25. In the present embodiment, since first molded articles MD1 serving as insert parts are disposed in the second cavities Cv2, the second molding material MM2 injected from the second nozzle 280 fills the spaces defined by the second fixed mold 22, the movable mold 25, and the first molded products MD1. In the spaces defined by the second fixed mold 22, the movable mold 25, and the first molded articles MD1, the second molding material MM2 is cured to mold second molded articles MD2 in which a portion made of the first molding material MM1 and a portion made of the second molding material MM2 are integrated.

In process step P60, the second injection molding machine 205 uses the second mold clamping device 290 to separate the movable mold 25 from the second fixed mold 22. In process step P60, the ejector pins 29 housed in the movable mold 25 protrude from the movable mold 25 to release the second molded articles MD2 from the movable mold 25. The ejector pins 29 may be configured to protrude from the movable mold 25 according to movement of the movable mold 25 with respect to the second fixed mold 22, or may be configured to protrude from the movable mold 25 by a motor driven under the control of the controller 505, for example. Thereafter, the second molded articles MD2 are transported to the inspection device 406 by the extractor 405, inspected by the inspection device 406, and then arranged on a tray. The tray on which the second molded articles MD2 are arranged is taken out of the injection molding system 10. The movable mold 25 is taken out from the second injection molding machine 205 by the third moving section 330, and is moved to the first injection molding machine 105 by the second moving section 320 and the first moving section 310. The injection molding system 10 can repeatedly manufacture the second molded article MD2 by the method described above.

According to the injection molding system 10 of the present embodiment described above, after the first injection molding machine 105 molds the first molded article MD1 using the first fixed mold 21 and the movable mold 25, the movement mechanism 305 moves the movable mold 25, in a state in which the first molded article MD1 is not released but is in intimate contact with the movable mold 25, from the first injection molding machine 105 to the second injection molding machine 205, and the second injection molding machine 205 uses the second fixed mold 22 and the movable mold 25 to mold the second molded article MD2 with the first molded article MD1 as an insert part. Since the first molded article MD1, which is an insert component, is not released from the movable mold 25 prior to the molding of the second molded article MD2, the positional deviation of the insert component with respect to the movable mold 25 is suppressed. Therefore, in insert molding, it is possible to easily ensure the positioning accuracy of the insert part with respect to the movable mold 25.

In the present embodiment, the movement mechanism 305 is configured to move the movable mold 25 from the first injection molding machine 105 to the second moving section 320 using the first moving section 310, move the movable mold 25 from the vicinity of the first moving section 310 to the vicinity of the third moving section 330 using the second moving section 320, and move the movable mold 25 from the second moving section 320 to the second injection molding machine 205 using the third moving section 330. Therefore, complication of the configuration and operation of each of the moving sections 310, 320, and 330 can be suppressed.

Further, in the present embodiment, the second moving section 320 is provided with the temperature adjustment section 325 for adjusting the temperature of the movable mold 25 on the slide section 322 on which the movable mold 25 is placed. Therefore, the movable mold 25 can be kept warm or preheated while the movable mold 25 is being moved by the second moving section 320 or while the movable mold 25 stands by on the slide section 322. In particular, in this embodiment, since the second molding material MM2 injected by the second injection molding machine 205 is a thermosetting resin, the time for curing the second molding material MM2 can be shortened by keeping the movable mold 25 warm or preheated.

In the present embodiment, the movement mechanism 305 is provided in the third unit 300 disposed between the first unit 100 having the first injection molding machine 105 and the second unit 200 having the second injection molding machine 205. Therefore, it is possible to reduce the size of the injection molding system 10 in the front-rear direction compared to a configuration in which the movement mechanism 305 is provided in front of or behind the first unit 100 and the second unit 200. Further, since the movement mechanism 305 is provided in the third unit 300, the installation place of the movement mechanism 305 can be easily changed.

In the present embodiment, the movable mold 25 includes an ejector pin 29 that pushes out the second molded article MD2. Therefore, the second molded article MD2 can be easily released from the movable mold 25.

Further, in this embodiment, the first molding material MM1 injected by the first injection molding machine 105 is a thermoplastic resin, and the second molding material MM2 injected by the second injection molding machine 205 is a thermosetting resin. Therefore, it is possible to mold the second molded article MD2 in which the portion composed of the thermoplastic resin and the portion composed of the thermosetting resin are integrated.

In the present embodiment, the second injection molding machine 205 for injecting the thermosetting resin is provided with the refrigerant channel 287 for cooling the second nozzle 280. Therefore, it is possible to suppress the occurrence of clogging in the second nozzle 280 due to the thermosetting resin starting to cure in the second nozzle 280.

B. Second Embodiment

Figure 10:
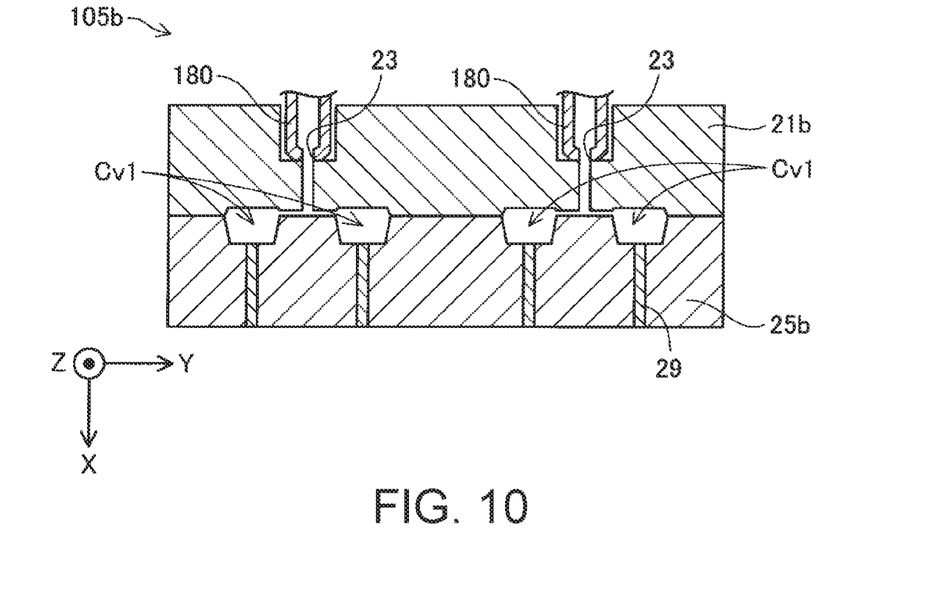
FIG. 10 is an explanatory view showing schematic configuration of a first injection molding machine according to a second embodiment.
Figure 11:
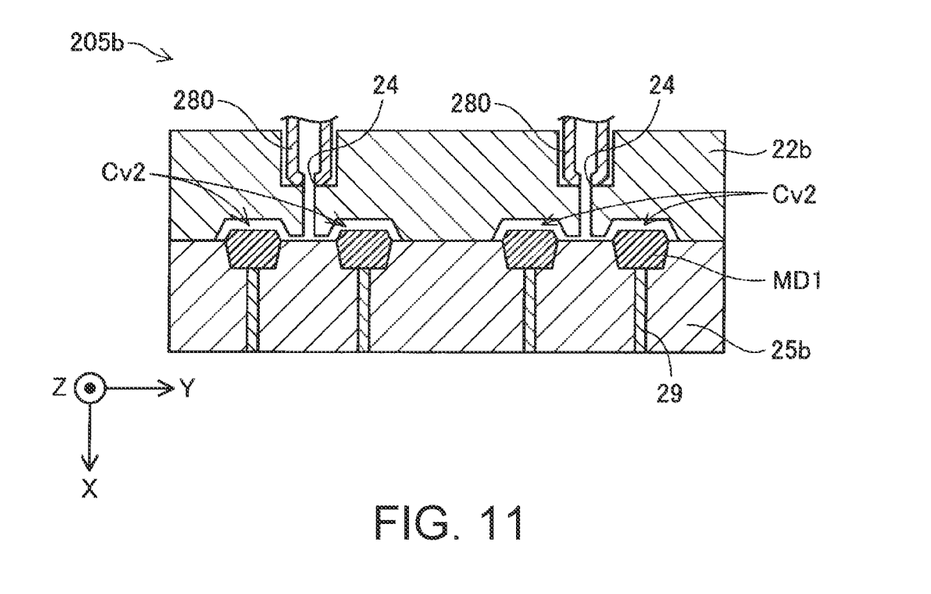
FIG. 11 is an explanatory view showing schematic configuration of a second injection molding machine according to the second embodiment.

FIG. 10 is an explanatory view showing schematic configuration of a first injection molding machine 105b in a second embodiment. FIG. 11 is an explanatory view showing schematic configuration of the second injection molding machine 205b in the second embodiment. The second embodiment differs from the first embodiment in that the first injection molding machine 105b includes a plurality of first nozzles 180 and the second injection molding machine 205b includes a plurality of second nozzles 280. Other configurations are the same as those of the first embodiment unless otherwise described.

As shown in FIG. 10, in this embodiment, a plurality of first cavities Cv1 are defined by a first fixed mold 21b and a movable mold 25b. The first fixed mold 21b is provided with a plurality of first openings 23. Each first opening 23 communicates with corresponding first cavities Cv1. In FIG. 10, two first nozzles 180, two first openings 23, and four first cavities Cv1 are illustrated. One of the two first openings 23 communicates with two of the first cavities Cv1. The other of the two first openings 23 communicates with two of the first cavities Cv1 that are different from the two first cavities Cv1 described above. Each first nozzle 180 communicates with the first injection cylinder 171. The first molding material injected from one of the two first nozzles 180 fills two of the first cavities Cv1 via one of the two first openings 23. The first molding material ejected from the other of the two first nozzles 180 fills, through the other of the two first openings 23, two of the first cavities Cv1 different from the above-described two first cavities Cv1.

As shown in FIG. 11, in this embodiment, a plurality of second cavities Cv2 are defined by a second fixed mold 22b and the movable mold 25b. The number of the second cavities Cv2 is equal to the number of the first cavities Cv1. The position of each second cavity Cv2 corresponds to the position of each first cavity Cv1. The second fixed mold 22b is provided with a plurality of second openings 24. Each second opening 24 communicates with corresponding second cavities Cv2. In FIG. 11, two second nozzles 280, two second openings 24, and four second cavities Cv2 are shown. One of the two second openings 24 communicates with two of the second cavities Cv2. The other of the two second openings 24 communicates with two of the second cavities Cv2 different from the above-described two second cavities Cv2. Each of the second nozzles 280 communicates with the second injection cylinder 271. The second molding material injected from one of the two second nozzles 280 fills two of the second cavities Cv2 via one of the two second openings 24. The second molding material ejected from the other of the two second nozzles 280 fills two of the second cavities Cv2 different from the above-described two second cavities Cv2 via the other of the two second openings 24. A first molded article MD1 is disposed in each second cavity Cv2 to be filled with the second molding material, and a second molded article MD2, in which a portion composed of the first molding material MM1 and a portion composed of the second molding material MM2 are integrated, is molded in each second cavity Cv2.

According to the present embodiment described above, a large number of second molded articles MD2 having the first molded article MD1 as an insert part can be molded at one time. In a case where insert parts are installed in cavities by manual work of a worker, a robot arm, or the like as in the related art, as the number of cavities increases, labor and time for installing the insert parts increase. On the other hand, in the present embodiment, no labor or time is required for installing the insert part. Therefore, the second molded article MD2 can be efficiently molded.

C. Other Embodiments (C1) In each of the embodiments described above, the first injection molding machines 105 and 105b are configured to inject a thermoplastic resin as the first molding material MM1, and the second injection molding machines 205 and 205b is configured to inject a thermosetting resin as the second molding material MM2. Alternatively, the first injection molding machines 105 and 105b may be configured to inject a thermoplastic resin as the first molding material MM1, and the second injection molding machines 205 and 205b may be configured to inject a thermoplastic resin as the second molding material MM2. Alternatively, the first injection molding machines 105 and 105b may be configured to inject a thermosetting resin as the first molding material MM1, and the second injection molding machines 205 and 205b may be configured to inject a thermosetting resin as the second molding material MM2. Alternatively, the first injection molding machines 105 and 105b may be configured to inject a thermosetting resin as the first molding material MM1, and the second injection molding machines 205 and 205b may be configured to inject a thermoplastic resin as the second molding material MM2.

(C2) In each of the above-described embodiments, the movement mechanism 305 is provided in the third unit 300. On the other hand, the movement mechanisms 305 may not be combined into a single unit. For example, the movement mechanism 305 may be configured by a robot arm provided in the first unit 100, which has the first injection molding machine 105, and a robot arm provided in the second unit 200, which has the second injection molding machine 205.

(C3) In each of the above-described embodiments, the movement mechanism 305 is constituted by the three moving sections 310, 320, and 330. In contrast, the movement mechanism 305 may be configured by a single robot arm that moves the movable mold 25 from the first injection molding machine 105 to the second injection molding machine 205, or the movement mechanism 305 may be configured by the first moving section 310 and the third moving section 330.

(C4) In each of the above-described embodiments, the movement mechanism 305 moves the movable mold 25 from the first injection molding machine 105 to the second injection molding machine 205 along a path passing above the base part of the housing. On the other hand, a path for the movable mold 25 may be provided in the base part of the housing, and the movement mechanism 305 may be configured to move the movable mold 25 from the first injection molding machine 105 to the second injection molding machine 205 via the path. The movement mechanism 305 may be configured to move the movable mold 25 from the first injection molding machine 105 to the second injection molding machine 205 via a path passing to the front or to the rear outside of the housing.

(C5) In each of the above-described embodiments, the slide section 322 of the second moving section 320 is provided with the temperature adjustment section 325. On the other hand, the temperature adjustment section 325 may not be provided.

(C6) In each of the embodiments described above, the movable molds 25 and 25b are provided with ejector pins 29. In contrast, ejector pins 29 may not be provided in movable molds 25 and 25b.

(C7) In each of the embodiments described above, the second nozzle 280 for injecting the thermosetting resin is provided with the refrigerant channel 287. On the other hand, the refrigerant channel 287 may not be provided in the second nozzle 280.

(C8) In each of the embodiments described above, after the first injection molding machine 105 injects the first molding material MM1 into the first cavity Cv1, the movement mechanism 305 moves the movable mold 25 filled with the first molding material MM1 from the first injection molding machine 105 to the second injection molding machine 205, and the second injection molding machine 205 injects the second molding material MM2 into the second cavity Cv2. On the other hand, while the movable mold 25 is moved from the first injection molding machine 105 to the second injection molding machine 205, or while the second injection molding machine 205 injects the second molding material MM2 into the second cavity Cv2, the first injection molding machine 105 may inject the first molding material MM1 into another movable mold 25. In this case, each of the molded articles MD1 and MD2 can be molded more efficiently.

D. Other Forms

The present disclosure is not limited to the embodiments described above, and can be realized in various configurations without departing from the spirit thereof. For example, the present disclosure can also be realized by the following configurations. The technical features in the above described embodiments corresponding to the technical features in each embodiment described below can be appropriately replaced or combined in order to solve a part or all of the problems of the present disclosure or to achieve a part or all of the effects of the present disclosure. In addition, unless the technical features are described as essential features in the present specification, the technical features can be appropriately deleted.

(1) According to one aspect of the present disclosure, an injection molding system is provided. The injection molding system includes a first unit that has a first injection molding machine configured to inject a first molding material into a first cavity partitioned by a first fixed mold and a movable mold, a second unit that includes a second injection molding machine configured to inject a second molding material into a second cavity partitioned by a second fixed mold and the movable mold, and a movement mechanism configured to, after the first molding material is injected into the first cavity, move the movable mold filled with the first molding material from the first injection molding machine to the second injection molding machine.

According to the injection molding system of this form, the movement mechanism moves the movable mold in a state in which the insert part made of the first molding material molded by the first injection molding machine is in intimate contact with the movable mold, so that the process step of positioning the insert part prior to injection of the second molding material from the second injection molding machine can be eliminated. Therefore, the positioning of the insert part can be facilitated.

(2) In the injection molding system of the above aspect, the movement mechanism may include a first moving section that takes the movable mold out from the first injection molding machine, a second moving section that moves the movable mold taken out by the first moving section from the first unit toward the second unit, and a third moving section that places the movable mold moved by the second moving section in the second injection molding machine. According to the injection molding system of this aspect, it is possible to suppress the operation of each moving section from becoming complicated.

(3) In the injection molding system of the above aspect, the movement mechanism may include a temperature adjustment section that adjusts a temperature of the movable mold when the movable mold is moved from the first injection molding machine to the second injection molding machine.

According to the injection molding system of this form, the temperature of the movable mold during movement can be adjusted.

(4) The injection molding system of the above aspect may further include a third unit disposed between the first unit and the second unit, wherein the movement mechanism is provided in the third unit. According to the injection molding system of this aspect, since the movement mechanism is integrated into one unit, it is possible to easily change the installation location of the movement mechanism when changing the installation location of the movement mechanism.

(5) In the injection molding system of the above aspect, the movable mold may include an ejector pin that extrudes a molded article.

According to the injection molding system of this aspect, it is possible to easily remove the molded article having the portion made of the first molding material and the portion made of the second molding material from the movable mold.

(6) In the injection molding system of the above aspect, at least one of the first molding material or the second molding material may be a thermosetting resin.

According to the injection molding system of this aspect, a molded article at least a part of which is formed of a thermosetting resin can be molded.

(7) In the injection molding system of the above aspect, at least one of the first injection molding machine or the second injection molding machine may include a nozzle that injects the thermosetting resin, and a cooling unit that cools the nozzle. According to the injection molding system of this aspect, since the nozzle that injects the thermosetting resin can be cooled by the cooling unit, it is possible to suppress curing of the thermosetting resin in the nozzle.

(8) In the injection molding system of the above aspect, the first fixed mold and the movable mold may define a plurality of the first cavities, the second fixed mold and the movable mold may define a plurality of the second cavities, the first fixed mold may have a plurality of first openings that communicate with the plurality of first cavities, the second fixed mold may have a plurality of second openings communicating with the plurality of second cavities, the first injection molding machine may include a plurality of first nozzles that inject the first molding material into the plurality of first openings, and the second injection molding machine may includes a plurality of second nozzles that inject the second molding material into the plurality of second openings.

According to the injection molding system of this aspect, a plurality of molded articles having a portion made of the first molding material and a portion made of the second molding material can be molded at one time.

The present disclosure can be realized in various forms other than an injection molding system. For example, it can be realized in the form of a control method of an injection control system, an insert molding method or the like.

What is claimed is:

1. An injection molding system comprising:
    a first unit that includes a first injection molding machine configured to inject a first molding material into a first cavity partitioned by a first fixed mold and a movable mold;
    a second unit that includes a second injection molding machine configured to inject a second molding material into a second cavity partitioned by a second fixed mold and the movable mold; and
    a movement mechanism configured to, after the first molding material is injected into the first cavity, move the movable mold filled with the first molding material from the first injection molding machine to the second injection molding machine, the movement mechanism including:
        a first robot configured to take the movable mold from the first injection molding machine;
        a slider on which the first robot places the movable mold when the slider is located at a first position, the slider being configured to move the movable mold from the first position directly adjacent to the first injection molding machine to a second position directly adjacent to the second injection molding machine; and
        a second robot configured to grip the movable mold from the slider when the slider is located at the second position and place the movable mold in the second injection molding machine,
    wherein a heater is placed at the slider, and
    the heater is configured to adjust a temperature of the movable mold while the movable mold moves from the first position to the second position on the slider.

2. The injection molding system according to claim 1, wherein
    the movement mechanism is provided in a third unit disposed between the first unit and the second unit.

3. The injection molding system of claim 1, wherein
    the movable mold includes an ejector pin that extrudes a molded article.

4. The injection molding system according to claim 1, wherein
    at least one of the first molding material and the second molding material is a thermosetting resin.

5. The injection molding system according to claim 4, wherein
    at least one of the first injection molding machine and the second injection molding machine includes a nozzle that injects the thermosetting resin, and a cooler configured to cool the nozzle.

6. The injection molding system according to claim 1, wherein
    the first fixed mold and the movable mold define a plurality of the first cavities,
    the second fixed mold and the movable mold define a plurality of the second cavities,
    the first fixed mold has a plurality of first openings communicating with the plurality of the first cavities,
    the second fixed mold has a plurality of second openings that communicate with the plurality of the second cavities,
    the first injection molding machine has a plurality of first nozzles that inject the first molding material into the plurality of first openings, and
    the second injection molding machine has a plurality of second nozzles that inject the second molding material into the plurality of second openings.

7. The injection molding system according to claim 2, wherein
    the second unit is disposed between the third unit and a fourth unit,
    the forth unit includes an inspection device having a camera for capturing an image of a molded article that includes a portion made from the first molding material and a portion made from the second molding material, and
    the fourth unit includes a third robot configured to take out the molded article from the movable mold attached to the second injection molding machine and move the molded article to the inspection device.

8. The injection molding system according to claim 1, further comprising:
    a clamping device that fixes the movable mold to the first injection molding machine,
    a memory configured to store a program; and a processor configured to execute the program so as to control the clamping device to release the movable mold from the first injection molding machine after the first robot grips the movable mold.

9. The injection molding system according to claim 1, further comprising:

a third robot configured to take out a molded article from the movable mold attached to the second injection molding machine, the molded article including a portion made from the first molding material and a portion made from the second molding material, a memory configured to store a program; and a processor configured to execute the program so as to control the movement mechanism to move the movable mold from the second injection molding machine to the first injection molding machine after the third robot takes out the molded article from the movable mold attached to the second injection molding machine.

\* \* \* \* \*